Feb. 8, 1927.
C. G. SMITH
ELECTRICAL APPARATUS
Original Filed Jan. 3, 1922
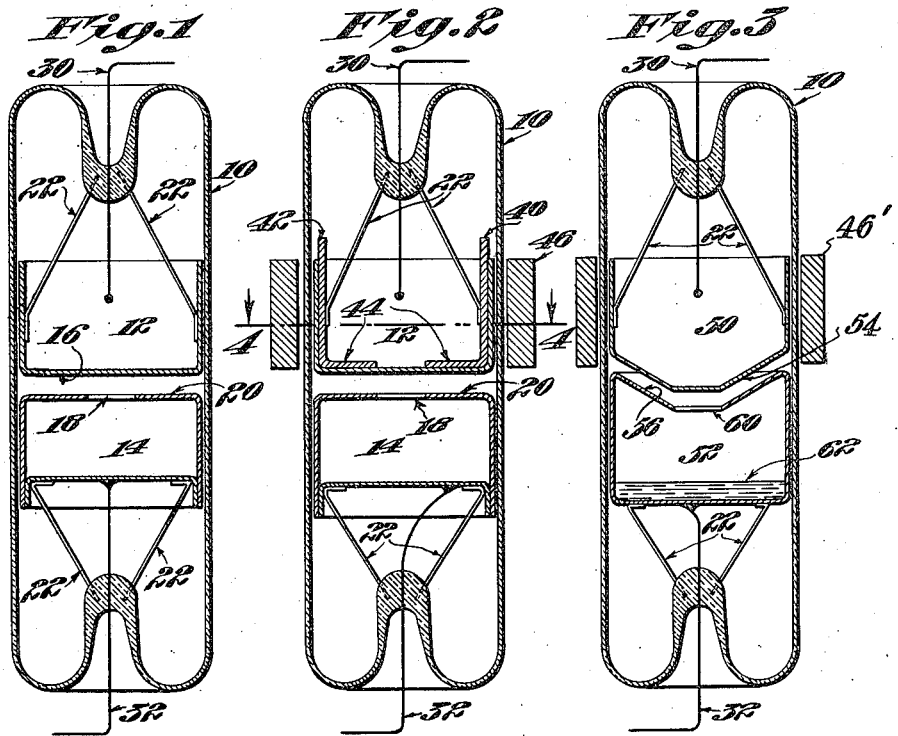

Patented Feb. 8, 1927.

1,617,180

UNITED STATES PATENT OFFICE.

CHARLES G. SMITH, OF MEDFORD, MASSACHUSETTS, ASSIGNOR, BY MESNE ASSIGNMENTS, TO RAYTHEON MANUFACTURING COMPANY, OF CAMBRIDGE, MASSACHUSETTS, A CORPORATION OF MASSACHUSETTS.

ELECTRICAL APPARATUS.

Application filed January 3, 1922, Serial No. 526,788. Renewed December 18, 1923.

The present invention relates to electrical apparatus and more particularly to apparatus of the type involving short path phenomena such as the apparatus disclosed in the patent of Smith 1,545,207, July 7, 1925, and application Serial No. 415,536, filed October 8, 1920.

I have devised a new form of tube which relies upon the short path principles as heretofore stated to insulate against gaseous conduction, this tube embodying a hollow electrode which permits the formation of a space charge and causes conduction when the hollow electrode is negative. In one simple form of the invention a hollow cathode member is provided, this member being closed except for a relatively small opening extending through the wall of the member opposing the cooperating electrode. The opposing surfaces of the two electrodes are spaced apart a distance which is short and insufficient to permit ionization and gaseous conduction. Such a tube will practically rectify, causing current to be conducted in one direction and insulating against any substantial conduction of current in the opposite direction. The application of a properly designed magnetic field to such a tube will in addition completely remove any trace of conduction which may tend to take place when the non-hollow electrode acts as a cathode. This magnetic field under certain conditions may be also useful in reducing the voltage drop through the tube.

In the accompanying drawings illustrating the preferred form of the invention Fig. 1 represents a section in elevation of a simple form of tube embodying the features of the invention; Fig. 2 represents a section in elevation of a similar form of tube with means for impressing a magnetic field upon one of the electrodes; Fig. 3 is a section in elevation of a modified form of tube employing liquid metal in the hollow electrode; Fig. 4 is a cross section in elevation of the tube shown in Fig. 2; and Fig. 5 is a simple circuit embodying the tube.

The illustrated embodiment of the invention shown in Fig. 1 comprises a hermetically sealed receptacle 10 filled with helium or similar gas and having cooperating electrodes 12 and 14 immersed therein. The electrode 12 may conveniently take the form of a cylindrical cup open at the upper end and having a plane lower face 16. The electrode 14 is conveniently formed as a hollow shell closed except for a relatively small opening 18 extending through the upper plane face 20. Each of the electrodes is supported from an opposite end of the receptacle 10 by arms, indicated at 22, and the opposite plane faces 16 and 20 are spaced a relatively short distance apart, which is insufficient to permit ionization. The two electrodes 12 and 14 are respectively connected with leading-in wires 30 and 32 to permit the connection of the tube into an electric circuit. If such a tube is connected into a suitable form of electric circuit with the hollow electrode acting as a cathode, current may be freely passed through the tube. If, on the other hand, the electrode 12 is negative the tube will insulate against any substantial conduction. If a source of alternating current is connected in circuit with the tube the tube will then act as a rectifier, conducting current when the hollow electrode is negative and insulating against conduction when the opposite electrode 12 is negative.

The theory underlying the operation of this tube is complicated and mathematical but briefly stated the properties of the tube depend upon the formation of a positive space charge in the hollow electrode which serves to maintain conduction when this electrode acts as the cathode, this theory being explained more fully in my copending application Serial No. 526,095 filed December 31, 1921.

As stated previously, although a tube of the character shown in Fig. 1 will operate satisfactorily as a rectifier without a magnetic field impressed thereon, nevertheless the addition of a magnetic field, as shown in Figs. 2 and 4, serves to completely remove any trace of conduction when the upper electrode is negative. As shown clearly in Figs. 2 and 4, the usual enclosing receptacle 10 is provided with the electrodes 12 and 14, the lower hollow electrode 14 having the opening 18 therein. The upper cup-shaped electrode 12 is provided with pole pieces 40 and 42 of magnetic material, each having an inturned end 44 at the bottom to localize the magnetic field. This field may be conveniently created by a magnet 46 located opposite the upper electrode, as shown in the drawings. The addition of such a magnetic field in the manner substantially as indicated serves to divert electrons away from the opening 18 and cause them to impact with the face 20 in a manner to render their paths short and hence to shut off any trace of conduction when the upper electrode is negative.

A third form of tube embodying the principle of the hollow cathode may be constructed as shown in Fig. 3 and may also have a magnet 46' like 46 in Fig. 2. This tube is provided with upper and lower electrodes 50 and 52 respectively, the upper electrode having a frusto conical face 54, which is opposed by a similarly shaped recessed face 56 formed on the hollow cathode 52, the recessed face 56 having an opening 60 at the lowest portion. In order to avoid variations in the gas pressure and disintegration of the hollow cathode member, it has been found desirable to provide a small quantity of metallic tin inside of the space 52. This metallic tin may conveniently be amalgamated to the iron or other metal comprising the hollow cathode, forming a thin coating over the internal surface of the cathode. During the normal operation of the tube this tin is in a liquid condition. When the tube ceases to operate and the electrodes are reduced in temperature, the tin hardens into solid form so that the tube may be freely handled without liability of the tin leaving the hollow space 52. Even in the molten condition it is extremely difficult for the tin to run out or be shaken out of the hollow cathode, due to the configuration of this member and to the attraction of the tin for the underlying and supporting metal. If an excess of tin is employed the excess forms a pool at the bottom of the hollow cathode as shown at 62. It will be obvious to those skilled in the art that by shaping the face 56 of the hollow cathode member in the manner shown the liquid will not ordinarily spill out of the cathode member when the tube is tipped or reversed in position, due to the fact that a trough is formed about the opening 60 which is capable of receiving the liquid metal without causing it to overflow through the opening.

Fig. 5 of the drawing illustrates a simple form of rectifying circuit embodying the tube, this circuit comprising the source of alternating current indicated at 50', primary and secondary windings indicated at 52' and 54' and a circuit 56' including the tube and any suitable form of load.

While it is preferred to employ the specific construction and arrangement of parts shown and described it will be understood that this construction and arrangement is not essential except so far as specified in the claims and may be changed or modified without departing from the broader features of the invention.

In a generic sense, the term hollow cathode includes a cathode whose active surface only partially surrounds a gaseous medium so that the medium immediately adjacent the active surface is more or less pocketed or confined.

The invention having been described, what is claimed is:

1. An electrical apparatus comprising a gas filled receptacle, a cathode and an anode received within the receptacle, the cathode having an opening extending through the surface and communicating with a space behind the surface, means for creating an electric field in the space separating the electrodes and means for impressing a magnetic field upon the space separating the electrodes.

2. An electrical apparatus comprising a gas filled receptacle, a plurality of electrodes immersed in the gas within the receptacle, one of the electrodes being hollow and having an opening extending therethrough into the space surrounded by the walls of the electrode and a quantity of metal received within the hollow electrode of such a character that it becomes molten during the operation of the apparatus.

3. An electrical apparatus comprising a gas filled receptacle, two electrodes received within the receptacle and having substantially frusto conical surfaces spaced in close proximity, one of the electrodes having an opening extending through the frusto conical surface adjacent the central portion, a body of liquid metal contained in the space with which the opening communicates, and means for creating an electric field in the space separating the frusto conical surfaces.

4. An electrical apparatus comprising a gas filled receptacle, two electrodes received within the receptacle and having substantially frusto conical surfaces spaced in close proximity, one of the electrodes having an opening extending through the frusto conical surface adjacent the central portion, a body of liquid metal contained in the space with which the opening communicates, means for creating an electric field in the space separating the frusto conical surfaces, and means for impressing a magnetic field upon the space separating the surfaces.

5. An electrical discharge apparatus comprising a gas filled receptacle, cooperating electrodes in the receptacle, and a coating of a metal on one of the electrodes, the melting point of said metal being of the order of magnitude of that of tin.

6. An electrical discharge apparatus comprising cathode and anode immersed in a gas, means for introducing an electric field between the electrodes to cause gaseous ionization and conduction, and a coating of a metallic substance on the cathode for stabilizing the gas pressure, the substance maintaining a part of the surface of the cathode coated during operation.

7. An electrical discharge apparatus comprising a gas filled receptacle, cooperating electrodes enclosed within the receptacle and having opposing surfaces spaced apart a distance comparable to the mean free path of electrons in the gas, means for causing gaseous ionization between the electrodes, and a coating of metallic tin on one of the electrodes.

8. Gaseous conduction apparatus comprising a hollow cathode having a restricted opening and an anode presented to the interior of the cathode through said opening, and means on the interior surface of the cathode to prevent gas being trapped in said surface by the electrical phenomena incident to the normal operation of the apparatus, and means for restricting the current to said opening.

9. Gaseous conduction apparatus comprising an anode, a cathode surface presented to said anode, said surface being coated with material which adheres when cold but is partially liberated when heated, and the cathode being shaped to restrict the escape of said material when liberated.

10. Gaseous conduction apparatus comprising a tube having an anode, a cathode surface presented to said anode, said surface being coated with material which adheres when cold but is partially liberated when heated, and means to restrict the escape of said material when liberated.

11. An electrical apparatus comprising a gas filled receptacle, a hollow metallic electrode enclosed within the receptacle and having an amalgam of tin upon the inner surface, an opening through the electrode communicating with the interior, an opposing electrode having a surface positioned in close proximity to the surface through which the opening passes, and means for creating an electric field in the space separating the surfaces of the two electrodes.

12. Gaseous conduction apparatus comprising a hollow cathode having a restricted opening and an anode presented to the interior of the cathode through said opening, a metallic coating on the interior surface of the cathode to prevent gas being trapped in said surface by the electrical phenomena incident to the normal operation of the apparatus, and means for restricting the active surface of the cathode to said interior.

13. A gaseous conduction tube comprising an anode, a cathode surface presented to said anode, said surface being coated with material which adheres when cold but is partially liberated when heated, and means for substantially preventing the liberated material from reaching the wall of the tube.

14. An electrical discharge apparatus comprising cathode and anode immersed in a gas, means for introducing an electric field between the electrodes to cause gaseous ionization and conduction, and a coating of substance on the cathode for stabilizing the gas pressure, the substance maintaining a part of the cathode coated during operation.

CHARLES G. SMITH.